Dec. 28, 1954 A. FINKE 2,698,046
SEALING ARRANGEMENT
Filed May 17, 1952 3 Sheets-Sheet 1

INVENTOR.

Dec. 28, 1954  A. FINKE  2,698,046
SEALING ARRANGEMENT
Filed May 17, 1952  3 Sheets-Sheet 2

INVENTOR.
Arno Finke
BY

Dec. 28, 1954  A. FINKE  2,698,046
SEALING ARRANGEMENT
Filed May 17, 1952  3 Sheets-Sheet 3

INVENTOR.
Arno Finke
BY

United States Patent Office 2,698,046
Patented Dec. 28, 1954

2,698,046

SEALING ARRANGEMENT

Arno Finke, Lengerich, Germany, assignor to Maschinenfabrik Windmöller & Hölscher, Lengerich, Germany Application May 17, 1952, Serial No. 288,492

Claims priority, application Germany May 21, 1951

13 Claims. (Cl. 154—42)

The present invention relates to sealing arrangement and more particularly to a heat sealing arrangement for producing bags out of superimposed sheets of a material adapted to be sealed by heat.

It is known to seal moving superimposed sheets of a suitable material by applying heat. However, during each sealing step the movement of the superimposed sheets has to be stopped while the sealing device engages the sheet which is a slow operation since heat sealing requires a certain time.

It is the object of the present invention to overcome this disadvantage and to provide a sealing device which moves at the same speed as the material to be sealed so that the sealing may be carried out while the material is in motion whereby a great output is achieved.

It is another object of the present invention to reciprocate the sealing device at such speed relatively to moving superimposed sheets of the material to be sealed that equally spaced seams are produced on the sheets.

It is a further object of the present invention to provide as a sealing device two carriages reciprocating in the direction of the movement of the sheets, at least one of the carriages being transversely movable towards the other carriage so that sealing ridges of the carriages may engage moving sheets while moving in the same direction as the sheets, and be disengaged from the sheets when moving in opposite direction.

It is a still further object of the present invention to fold the material to be sealed longitudinally into two superimposed sheets and to produce a plurality of equally spaced transversal seams on the sheets so that each sealing produces a plurality of bags which may be separated by cutting the sheets along the seams.

With these objects in view the present invention mainly consists in transporting means including transporting portions moving in a transportation direction and defining a path for the movement of superimposed elongated sheets of a material adapted to be sealed, the transporting means being adapted to engage and move the sheets longitudinally in the transportation direction, a sealing device located adjacent to the path so as to be adapted to seal the superimposed sheets to each other along seams, supporting means supporting the sealing device for reciprocating movement along the path in the transportation direction and in a return direction opposite thereto, operating means reciprocating the sealing device and moving the same in the transportation direction at the speed of the transporting portions and of the sheets, actuating means moving the sealing device at the beginning of the movement of the same in the transportation direction in a direction transversal to, and towards the path so that the sealing device engages at least one of the superimposed sheets, the actuating means moving the sealing device at the end of the movement of the same in the transportation direction away from the path so as to disengage the sealing device for the return movement of the same from the sheets, and motion transmitting means connecting the transporting means, the operating means, and the actuating means for movement in a predetermined order.

Preferably the sealing device is provided with at least two longitudinally spaced heated ridges, and the actuating means move such ridges into sealing engagement with the superimposed sheets when the ridges are spaced from the seams produced by the preceding sealing for the distance between the ridges so as to produce equally spaced seams along the entire length of the superimposed sheets.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
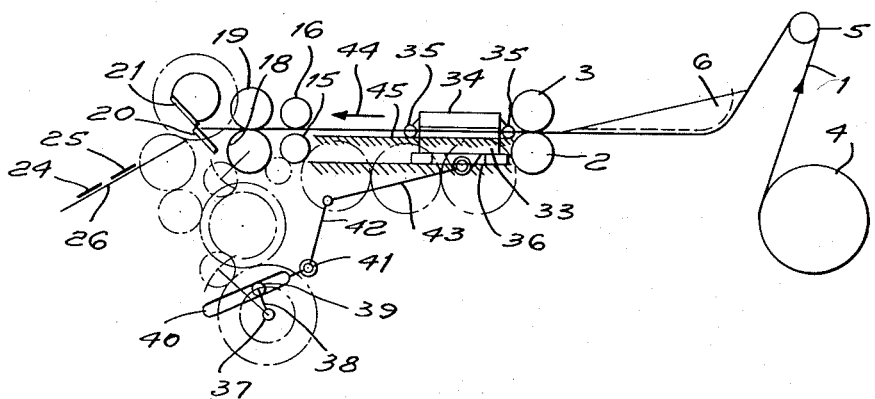
Fig. 1 is a schematic side view of an arrangement according to a preferred embodiment of the present invention.
Figure 2:
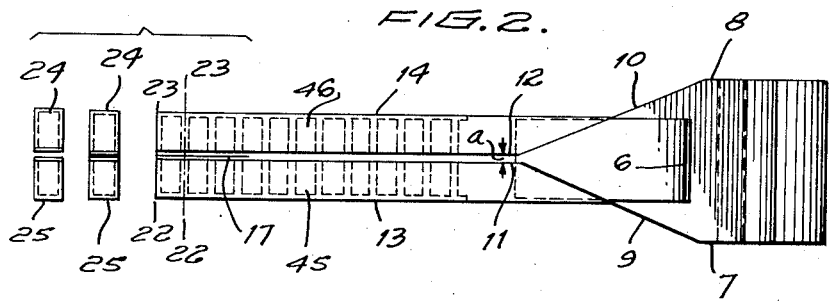
Fig. 2 is a plan view illustrating the folding of the material, and the seams produced by the sealing device.
Figure 3:
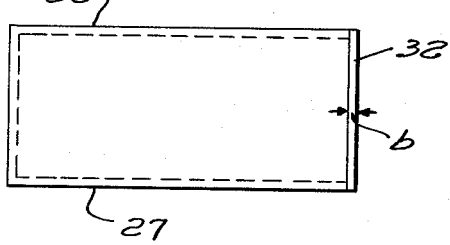
Fig. 3 shows a bag produced by the sealing arrangement.

Referring now to the drawings, Fig. 1 shows the material to be sealed 1 which is drawn off a feeding roll 4 and guided over a guiding roller 5 to a folding device 6 over which the material is longitudinally folded to form two superimposed sheets, the edges 9 and 10 passing over the folding device 6 towards each other. Member 6 has such width that the edges 11, 12 of the material are in folded condition spaced from each other for a small distance a. Consequently, when transversal seams 13, 14 are produced by means which will be described later on, it is possible to cut the superimposed sheets along lines 22, 23 extending in the middle of aligned seams 13, 14 and also to cut the lower sheet longitudinally along line 17 whereby bags 24, 25 are produced. Fig. 3 shows a bag produced in this manner, and it will be noted that one-half of the bag projects over the other half of the bag for a distance b, which is one-half of a, and forms an edge which facilitates opening of the bag. The seams 27, 28 correspond to the seams 13 or 14, respectively, having however only half the width of the same.

Referring again to Fig. 1, the transporting rollers 15, 16, which may be cooled, rotate in the same direction and at the same speed as rollers 2, 3 so that the transporting portions of the rollers which engage the superimposed sheets 1 move the same at the predetermined transporting speed between the upper carriage 34 and the lower carriage 33 of a sealing device in the transportation direction indicated by arrow 44. A crank 38 rotating with a driven actuating shaft 37 is provided with a pin 39 projecting into the slot 40 of the rocking lever 42 which is pivoted at 41. The upper end of the rocking lever 42 is connected by link means 43 to the carriage means 33, 34, so that when crank 38 is rotated, the rocking lever 42 reciprocates the carriage means 33, 34 which move on wheels 35 along supporting rails 36.

The arrangement of the crank drive is such that the carriage means 33, 34 move in the transportation direction indicated by arrow 44 at the speed of the transporting portions of the transporting rollers. During the return movement of the carriage the upper and the lower carriages are separated, while during the forward movement of the carriage means the two carriages are pressed together by means which are not shown in Fig. 1, and perform the sealing operation.

By adjusting the length of the rocking lever 42 it is possible to vary the stroke of the carriage means and the spacing of seams produced by consecutive sealing operations. If for instance two longitudinally spaced transversal heated sealing ridges are provided in the sealing device for producing a pair of bags during each movement of the carriage means in the transportation direction, the transporting rollers move the sheets while the carriage means are returned so far that the sealing ridges are spaced from the seams produced in the preceding operation for the distance between the sealing ridges when the sealing ridges engage the sheets again, so that besides the second pair of bags produced by the consecutive sealing operation, an intermediate pair of bags is produced.

Fig. 1 further shows cutting rollers 18, 19 which produce the longitudinal incision 17, and cutting means 20, 21 which cut the superimposed sheets along lines 22, 23, whereupon the finished bags 24, 25 drop on the table 26.

Referring now to the embodiment shown in Figs. 4 to 9, the superimposed sheets 1 are transported again by cooperating transporting rollers 2, 3 and 15, 16 between an upper carriage 34 and a lower carriage 33. The transporting rollers are interconnected by gears and connected by gear means 64 to the gear 48 which is fixedly secured to a fixed flange 49 on the actuating shaft 37. Gear means 64 are driven from the drive shaft 63. A pin 51 is fixedly secured to the gear 48 and is provided with a ball bearing 39 which slides in a cam recess or slot of the lever 42 rocking the same during rotation of gear 48. Lever 42 and an operating lever 52 are fixedly secured to rocking shaft 41 so that the rocking motion of lever 42 produced by pin 39 is transferred to operating lever 52. The lower carriage 33 carries a fixed bracket 53. Operating lever 52 and bracket 53 are provided with elongated slots 52', 53' in which a connecting rod 43 is pivotally mounted by nut and bolt means 43'. The connecting rod 43 and the lower carriage 33 reciprocate when levers 42 and 52 rock. By shifting the pivoting points of the connecting rod 43 in the elongated slots 52' and 53', the stroke of the carriage means 33, 34 may be adjusted.

The upper carriage 34 is provided with wheels 35 rolling on supporting rails 45 which are fixedly secured to the supporting frame 46, and is taken along by the lower carriage by means of projecting members 47 which are fixedly secured to the ends of the upper carriage. This arrangement permits movement of the lower carriage 33 toward and away from the upper carriage 34 during the reciprocating movement of the carriage means effected by the operating means 37, 48, 51, 42, 41, 52 and 43.

Actuating means are provided for moving the lower carriage 33 relatively to the upper carriage, such actuating means including a cam 54 which is fixedly secured to the actuating shaft 37 and the cam follower roller 55 which is rotatably mounted on a rod 56 which is slidably supported in a fork member carried by shaft 37. The rod 56 is reciprocated when the cam 54 rotates and pivots a lever 57 which is fixedly secured to a rotatably mounted shaft 58. A first pair of eccenters 62 are fixedly secured to the shaft 58 and turn in corresponding bores of the movable rails 36 which support the lower carriage 33. A lever 59, corresponding to lever 57, is fixed on shaft 58 and is pivotally secured to one end of a connecting rod 60, the other end of which is pivoted to a second lever 59 which is fixedly secured to a shaft 61 which is rotatably mounted in the supporting frame. Shaft 61 carries a further pair of fixed eccenters 62 which turn in bores of the movable rails 36 of the lower carriage 33.

When the forked rod 56 is reciprocated by the cam 54, the levers 57 and 59 and the eccenters 62 on shaft 58 are rocked. Simultaneously the connecting rod 60 causes the lever 59, shaft 61, and the eccenters 62 on shaft 61 to rock. The rocking movement of the four eccenters 62 effects raising and lowering of the rails 36 and thereby of the lower carriage 33. The shape of the cam 54 is such that the lower carriage 33 is lowered and disengaged from the superimposed sheets 1 just before the rocking lever 52 moves clockwise in Fig. 4 corresponding to a return movement of the carriage means in a direction oppositely to the transporting direction of the rollers 2, 3, 15, 16 and to the movement of the superimposed sheets 1. At the beginning of the forward movement of the carriage means cam 54 raises the lower carriage 33 into engagement with the superimposed sheets 1. Regardless of whether carriage 33 is raised or lowered, the upper carriage 34 is taken along by engaging the lower carriage by the projecting members 47.

Figures 5, 6:
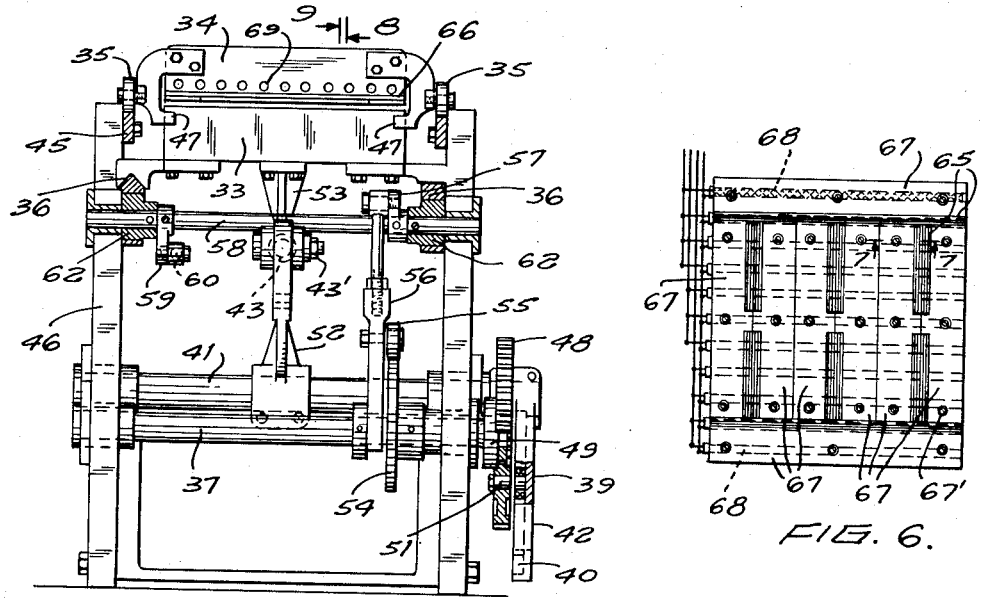
Fig. 5 is a front view of the embodiment showing Fig. 4.
Fig. 6 is a plan view of a sealing device.

Fig. 6 is a bottom view of the upper carriage showing transversal and longitudinal ridges 65. The lower carriage may be provided with corresponding ridges so that the ridges of the upper carriage and the lower carriage abut against each other in raised position of the lower carriage holding the superimposed sheets for sealing. It is, however, possible to provide only one carriage with ridges 65 which may abut against a plane surface of the other carriage which may carry a rubber plate.

Figure 7:
Fig. 7 is a cross-sectional view of a detail on line 7—7 in Fig. 6.
Figure 8:
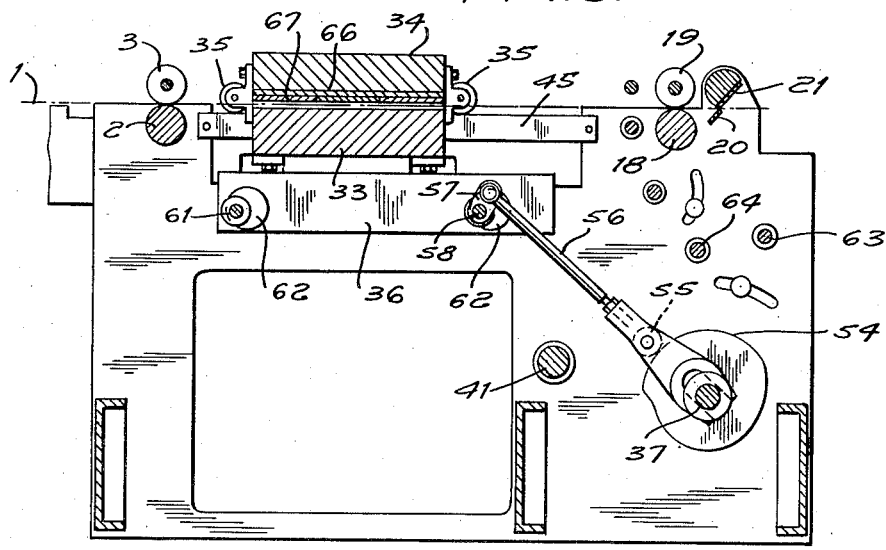
Fig. 8 is a longitudinal sectional view on line 8—8 in Fig. 5.
Figure 9:
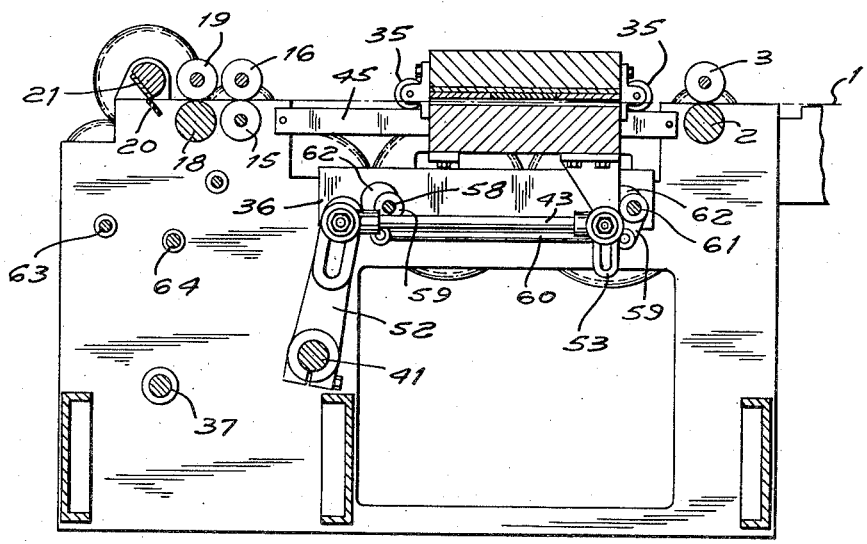
Fig. 9 is a longitudinal sectional view of line 9—9 in Fig. 5.

The ridges 65 are projecting portions of plates 67 which are secured by screws 67' by means of an intermediate plate (Fig. 5) to the carriage. Fig. 7 shows one of the plates 67 in a cross-sectional view.

Figure 4:
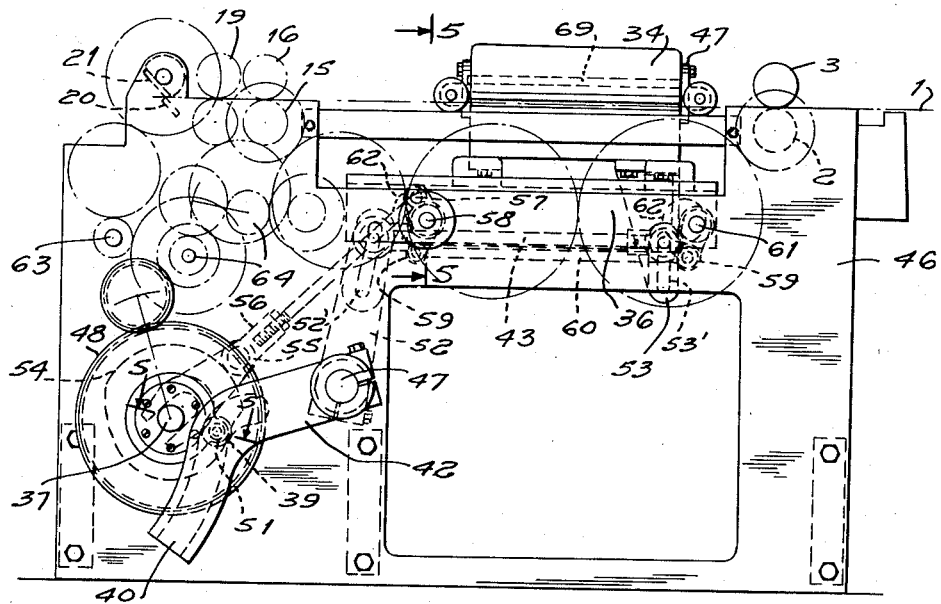
Fig. 4 is a side view of another embodiment of the present invention.

According to a preferred embodiment the ridges 65 are heated by electric resistors 68 which are inserted in the bores 69 (Figs. 4 and 5).

In the embodiment illustrated in Fig. 6 three transversal sealing ridges are provided, and the stroke and the speed of the carriage means is adjusted by moving connecting rod 43 in slots 52', and by changing the gear means 64 in such manner that the transversal ridge rearmost in the transportation direction engages the sheets spaced the seam distance from the foremost seam produced by the foremost transversal ridge in the preceding sealing operation so that all seams produced by the transversal ridges are equally spaced in the longitudinal direction of the superimposed sheets. The embodiment shown in Fig. 6 shows also longitudinally extending sealing ridges which seal the superimposed sheets along the folded edges thereof whereby the bottom of the bag is strengthened. A seam produced by a longitudinally extending sealing ridge would extend on the left side of the bag shown in Fig. 3 between the seams 27 and 28.

It will be understood that each of the elements described above, or two or more together, may also find a useful application in other types of sealing arrangements differing from the types described above.

While the invention has been illustrated and described as embodied in sealing arrangement provided with a sealing device moving during the sealing operation at the same speed as the material to be sealed, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A sealing arrangement, comprising, in combination, transporting means including transporting portions moving in a transportation direction and defining a path for the movement of superimposed elongated sheets of a material adapted to be sealed; a sealing device located adjacent to said path; movable supporting means supporting said sealing device for reciprocating movement parallel to said path in said transportation direction and in a return direction opposite thereto; operating means reciprocating said sealing device and moving the same in said transportation direction at the speed of said transporting portions and of said sheets; actuating means moving said movable supporting means and said sealing device at the beginning of the movement of the same in said transportation direction in a direction transversal to, and towards said path so that said sealing device moves in said transportation direction along said path and engages at least one of said superimposed sheets, said actuating means moving said movable supporting means and said sealing device at the end of the movement of the same in said transportation direction away from said path for a return movement of said sealing device parallel to said path; and motion transmitting means driving said transporting means, said operating means, and said actuating means for movement in a predetermined order.

2. A sealing arrangement, comprising, in combination, transporting means including transporting portions moving in a transportation direction and defining a path for the movement of superimposed elongated sheets of a material adapted to be heat sealed; a sealing device located adjacent to said path; movable supporting means supporting said sealing device for reciprocating movement parallel to said path in said transportation direction and in a return direction opposite thereto; operating means reciprocating said sealing device and moving the same in said transportation direction at the speed of said transporting portions and of said sheets; actuating means moving said movable supporting means and said sealing device at the beginning of the movement of the same in said transportation direction in a direction transversal to, and towards said path so that said sealing device moves in said transportation direction along said path and engages at least one of said superimposed sheets, said actuating means moving said sealing device at the end of the movement of the same in said transportation direction away from said path for a return movement of said sealing device parallel to said path; and motion transmitting means, driving said transporting means, said operating means, and said actuating means for movement in a predetermined order.

3. A sealing arrangement, comprising, in combination, transporting means including transporting portions moving in a transportation direction and defining a path for the movement of superimposed elongated sheets of a material adapted to be heat sealed; a heat sealing device located adjacent to said path and including at least one heated sealing ridge; movable supporting means supporting said sealing device for reciprocating movement parallel to said path in said transportation direction and in a return direction opposite thereto; operating means reciprocating said sealing device and moving the same in said transportation direction at the speed of said transporting portions and of said sheets; actuating means moving said movable supporting means and said sealing device at the beginning of the movement of the same in said transportation direction in a direction transversal to, and towards said path so that said sealing ridge of said heat sealing device moves in said transportation direction along said path and engages at least one of said superimposed sheets, said actuating means moving said sealing device at the end of the movement of the same in said transportation direction away from said path for a return movement of said sealing device parallel to said path; and motion transmitting means driving said transporting means, said operating means, and said actuating means for movement in a predetermined order.

4. A sealing arrangement, comprising, in combination, transporting means including transporting portions moving in a transportation direction and defining a path for the movement of superimposed elongated sheets of a material adapted to be heat sealed; a heat sealing device located adjacent to said path and including at least two heated sealing ridges longitudinally spaced from each other for a predetermined distance; movable supporting means supporting said sealing device for reciprocating movement parallel to said path in said transportation direction and in a return direction opposite thereto; operating means reciprocating said sealing device and moving the same in said transportation direction at the speed of said transporting portions and of said sheets; actuating means moving said movable supporting means and said sealing device at the beginning of the movement of the same in said transportation direction in a direction transversal to, and towards said path so that said two sealing ridges of said heat sealing device move in said transportation direction along said path and produce two longitudinally spaced sealed seams on said sheets, said actuating means moving said sealing device at the end of the movement of the same in said transportation direction away from said path for a return movement of said sealing device parallel to said path; and motion transmitting means driving said transporting means, said operating means, and said actuating means for movement in a predetermined order, so that said actuating means move said sealing device toward said path, and said sealing ridges into engagement with at least one of said sheets when said sealing ridges are longitudinally spaced from the last produced seams for said predetermined distance so as to produce equally spaced seams on said sheets.

5. A sealing arrangement, comprising, in combination, transporting means including transporting portions moving in a transportation direction and defining a path for the movement of superimposed elongated sheets of a material adapted to be heat sealed; carriage means including two carriages, one carriage located on one side of said path and the other carriage located on the other side of said path so that said sheets pass between said carriages, at least one of said carriages being transversely movable toward the other carriage; at least two pairs of cooperating sealing ridges longitudinally spaced from each other for a predetermined distance, one sealing ridge of each pair of sealing ridges located on one carriage, and the other sealing ridge of each pair of sealing ridges located on the other carriage; movable supporting means supporting said transversely movable carriage means, and fixed supporting means for supporting the other carriage means for reciprocating movement parallel to said path in said transportation direction and in a return direction opposite thereto; operating means reciprocating said carriage means and moving the same in said transportation direction at the speed of said transporting portions and of said sheets; actuating means moving said movable supporting means and said transversely movable carriage at the beginning of the movement of the same in said transportation direction in a direction transversal to, and towards said path so that said two pairs of sealing ridges move in said transportation direction along said path and engage said superimposed sheets and produce longitudinally spaced sealed seams on said sheets, said actuating means moving said transversely movable carriage at the end of the movement of the same in said transportation direction away from said path for a return movement of said transversely movable carriage means parallel to said path; and motion transmitting means driving said transporting means, said operating means, and said actuating means for movement in a predetermined order so that said actuating means move said transversely movable carriage toward said path, and said two pairs of sealing ridges into engagement with said sheets when said sealing ridges are longitudinally spaced from the last produced seams for said predetermined distance so as to produce equally spaced seams on said sheets.

6. A sealing arrangement, comprising, in combination, transporting means including transporting portions moving in a transportation direction and defining a path for the movement of superimposed elongated sheets of a material adapted to be heat sealed; carriage means including two carriages, one carriage located on one side of said path and the other carriage located on the other side of said path so that said sheets pass between said carriages, at least one of said carriages being transversely movable toward the other carriage; at least two sealing ridges longitudinally spaced from each other for a predetermined distance, located on one carriage; movable supporting means supporting said transversely movable carriage means for reciprocating movement parallel to said path in said transportation direction and in a return direction opposite thereto; operating means reciprocating said carriage means and moving the same in said transportation direction at the speed of said transporting portions and of said sheets; actuating means moving said movable supporting means and said transversely movable carriage at the beginning of the movement of the same in said transportation direction in a direction transversal to, and towards said path so that said two sealing ridges move in said transportation direction along said path and engage said superimposed sheets and produce longitudinally spaced sealed seams on said sheets, said actuating means moving said transversely movable carriage at the end of the movement of the same in said transportation direction away from said path for a return movement of said transversely movable carriage means parallel to said path; and motion transmitting means driving said transporting means, said operating means, and said actuating means for movement in a predetermined order so that said actuating means move said transversely movable carriage toward said path, and said two sealing ridges into engagement with said sheets when said sealing ridges are longitudinally spaced from the last produced seams for said predetermined distance so as to produce equally spaced seams on said sheets.

7. A sealing arrangement, comprising, in combination, a supporting frame; two spaced pairs of cooperating transporting rollers rotatably mounted on said supporting frame and defining a path for the longitudinal movement of superimposed elongated sheets of a material adapted to be heat-sealed; carriage means including two carriages, one carriage located on one side of said path and the other carriage on the other side of said path so that said sheets pass between said carriages, at least one of said carriages being transversely movable toward the other carriage; at least two longitudinally spaced transversal sealing ridges located on one of said carriages; means heating said sealing ridges; a first pair of supporting rails extending in said transportation direction and supporting said transversely movable carriage for reciprocating movement parallel to said path, said first pair of supporting rails being movable in a transversal direction; second supporting rails fixedly mounted on said supporting frame extending in said transportation direction and supporting the other carriage for reciprocating movement along said path; transversely extending projecting members fixedly secured to one of said carriages and slidingly engaging the other of said carriages so that said carriages move together in longitudinal direction and may move transversely relative to each other; operating means including an actuating shaft rotatably mounted in said supporting frame, said operating means reciprocating said transversely movable carriage on said first supporting rails; actuating means driven by said actuating shaft and being connected to said first supporting rails and moving the same at the beginning of the movement of said carriage means in said transportation direction, in a direction transversal to and towards said path so that said sealing ridges move in said transportation direction along said path and produce longitudinally spaced sealed seams on said sheets, said actuating means moving said first supporting rails at the end of the movement of said carriage means in said transportation direction away from said path for a return movement of said transversely movable carriage means parallel to said path; a drive shaft rotatably mounted in said supporting frame; first gear means connecting said drive shaft with said transporting rollers for driving the latter; and second gear means connecting said drive shaft with said actuating shaft for driving the same.

8. A sealing arrangement, comprising, in combination, a supporting frame; two spaced pairs of cooperating transporting rollers rotatably mounted on said supporting frame and defining a path for the longitudinal movement of superimposed elongated sheets of a material adapted to be heat-sealed, the pair of transporting rollers located forwardly in said direction of longitudinal movement being cooled; carriage means including two carriages, one carriage located on one side of said path and the other carriage on the other side of said path so that said sheets pass between said carriages, at least one of said carriages being transversely movable toward the other carriage; at least two longitudinally spaced transversal sealing ridges located on one of said carriages; means heating said sealing ridges; a first pair of supporting rails supporting said transversely movable carriage for reciprocating movement parallel to said path, said first pair of supporting rails being movable in a transversal direction and being formed with two spaced pairs of aligned cylindrical bores; second supporting rails fixedly mounted on said supporting frame and supporting the other carriage for reciprocating movement along said path; transversely extending projecting members fixedly secured to one of said carriages and slidingly engaging the other of said carriages so that said carriages move together in longitudinal direction and may move transversely relative to each other; operating means including an actuating shaft rotatably mounted in said supporting frame, said operating means reciprocating said transversely movable carriage on said first supporting rails; two transversely extending parallel shafts rotatably mounted in said supporting frame; two pairs of eccenter members turnably mounted in said bores of said first supporting rails, each pair of eccenter members being fixedly secured to one of said transversely extending shafts; connecting means connecting said transversely extending shafts for turning together; a lever fixedly secured to one of said shafts; a cam fixedly mounted on said actuating shaft; a cam follower engaging said cam; a rod connected at one end thereof to said cam follower and at the other end thereof to said lever so that the latter and said eccenter members are rocked when said cam moves along said cam follower, rocking of said eccenter members in said bores moving said first supporting rails at the beginning of the movement of said carriage means in said transportation direction in a direction transversal to and towards said path so that said sealing ridges move in said transportation direction along said path and produce longitudinally spaced sealed seams on said sheets, said eccenter members moving said first supporting rails, and thereby said transversely movable carriage, at the end of the movement of said carriage means in said transportation direction away from said path for a return movement of said transversely movable carriage means parallel to said path; a drive shaft rotatably mounted in said supporting frame; first gear means connecting said drive shaft with said transporting rollers for driving the latter; and second gear means connecting said drive shaft with said actuating shaft for driving the same.

9. A sealing arrangement, comprising, in combination, a supporting frame; two spaced pairs of cooperating transporting rollers rotatably mounted on said supporting frame and defining a path for the longitudinal movement of superimposed elongated sheets of a material adapted to be heat-sealed; carriage means including two carriages, one carriage located on one side of said path and the other carriage on the other side of said path so that said sheets pass between said carriages, at least one of said carriages being transversely movable toward the other carriage; at least two longitudinally spaced transversal sealing ridges located on one of said carriages; means heating said sealing ridges; a first pair of supporting rails supporting said transversely movable carriage for reciprocating movement parallel to said path, said first pair of supporting rails being movable in a transversal direction; second supporting rails fixedly mounted on said supporting frame and supporting the other carriage for reciprocating movement along said path; transversely extending projecting members fixedly secured to one of said carriages and slidingly engaging the other of said carriages so that said carriages move together in longitudinal direction and may move transversely relative to each other; a transversely extending actuating shaft rotatably mounted in said supporting frame; a gear member fixedly secured on said actuating shaft; a pin fixedly secured to said gear member spaced from said shaft; a rocking shaft rotatably mounted in said supporting frame parallel to said actuating shaft; a rocking lever fixedly secured to said rocking shaft and formed with a cam slot, said pin projecting into said cam slot so that said rocking lever and said rocking shaft are rocked during rotation of said gear member; an operating lever fixedly secured to said rocking shaft; a bracket fixedly secured to said transversely movable carriage; a connecting rod pivotally mounted at one end thereof on the free end of said operating lever and pivotally mounted at the other end thereof on said bracket so that said carriage means are longitudinally reciprocated; actuating means driven by said actuating shaft and being connected to said first supporting rails and moving the same, and thereby said transversely movable carriage, at the beginning of the movement of said carriage means in said transportation direction in a direction transversal to and towards said path so that said sealing ridges move in said transportation direction along said path and produce longitudinally spaced sealed seams on said sheets, said actuating means moving said first supporting rails, and thereby said transversely movable carriage, at the end of the movement of said carriage means in said transportation direction away from said path for a return movement of said transversely movable carriage means parallel to said path; a drive shaft rotatably mounted in said supporting frame; first gear means connecting said drive shaft with said transporting rollers for driving the latter; and second gear means connecting said drive shaft with said actuating shaft for driving the same.

10. A sealing arrangement, comprising, in combination, a supporting frame; two spaced pairs of cooperating transporting rollers rotatably mounted on said supporting frame and defining a path for the longitudinal movement of superimposed elongated sheets of a material adapted to be heat-sealed; carriage means including two carriages, one carriage located on one side of said path and the other carriage on the other side of said path so that said sheets pass between said carriages, at least one of said carriages being transversely movable toward the other carriage; at least two longitudinally spaced transversal sealing ridges located on one of said carriages; means heating said sealing ridges; a first pair of supporting rails extending in said transportation direction and supporting said transversely movable carriage for reciprocating movement parallel to said path, said first pair of supporting rails being movable in a transversal direction; second supporting rails fixedly mounted on said supporting frame and supporting the other carriage for reciprocating movement along said path; transversely extending projecting members fixedly secured to one of said carriages and slidingly engaging the other of said carriages so that said carriages move together in longitudinal direction and may move transversely relative to each other; a transversely extending actuating shaft rotatably mounted in said supporting frame; a gear member fixedly secured on said actuating shaft; a pin fixedly secured to said gear member spaced from said shaft; a rocking shaft rotatably mounted in said supporting frame parallel to said actuating shaft; a rocking lever fixedly secured to said rocking shaft and formed with a cam slot, said pin projecting into said cam slot so that said rocking lever and said rocking shaft are rocked during rotation of said gear member; an operating lever fixedly secured to said rocking shaft and formed with an elongated slot at the free end thereof; a bracket fixedly secured to said transversely movable carriage and formed with an elongated slot at the free end thereof; a connecting rod pivotally mounted at one end thereof in said slot on the free end of said operating lever and pivotally mounted at the other end thereof in said slot on said bracket so that said carriage means are longitudinally reciprocated for an adjustable distance; actuating means driven by said actuating shaft and being connected to said first supporting rails and moving the same, and thereby said transversely movable carriage, at the beginning of the movement of said carriage means in said transportation direction in a direction transversal to and towards said path so that said sealing ridges move in said transportation direction along said path and produce longitudinally spaced sealed seams on said sheets, said actuating means moving said first supporting rails, and thereby said transversely movable carriage, at the end of the movement of said carriage means in said transportation direction away from said path for a return movement of said transversely movable carriage means parallel to said path; a drive shaft rotatably mounted in said supporting frame; first gear means connecting said drive shaft with said transporting rollers for driving the latter; and second gear means connecting said drive shaft with said actuating shaft for driving the same.

11. A sealing arrangement, comprising, in combination, a supporting frame; a feed roller rotatably mounted on said supporting frame and adapted to carry a roll of an elongated sheet of material adapted to be sealed; a guiding roller rotatably mounted on said supporting frame parallel to said feed roller and guiding said elongated sheet; an elongated folding device extending normal to the axis of said guiding roller and being substantially narrower than the axial extension of said guiding roller, said elongated sheet having a width slightly smaller than twice the width of said folding device so that the edges of said elongated sheet are spaced from each other when said sheet is folded over said folding device so as to form two superimposed sheets; transporting means including transporting portions moving in a transportation direction and defining a path for the movement of said two superimposed elongated sheets; a sealing device located adjacent to said path; movable supporting means supporting said sealing device for reciprocating movement parallel to said path in said transportation direction and in a return direction opposite thereto; operating means reciprocating said sealing device and moving the same in said transportation direction at the speed of said transporting portions and of said sheets; actuating means moving said movable supporting means and said sealing device at the beginning of the movement of the same in said transportation direction in a direction transversal to, and towards said path so that said sealing device moves in said transportation direction along said path and engages at least one of said superimposed sheets, said actuating means moving said sealing device at the end of the movement of the same in said transportation direction away from said path for a return movement of said sealing device parallel to said path; motion transmitting means driving said transporting means, said operating means, and said actuating means for movement in a predetermined order; first cutting means cutting said superimposed sheets through said sealed seams; and second cutting means longitudinally cutting one of said superimposed sheets between the spaced edges of the other superimposed sheet.

12. A sealing method for producing bags of a material adapted to be heat-sealed, comprising, in combination, the steps of folding along two longitudinal fold lines an elongated sheet of the material so as to produce a lower sheet and two superimposed sheets having longitudinal edges spaced a short distance from each other; continuously moving said superimposed sheets at a predetermined speed; sealing said superimposed sheets along transversal seams; longitudinally cutting said lower sheet between said longitudinal edges of said superimposed sheets; and transversely cutting said superimposed sheets in the middle of said transversal seams so as to form pairs of bags.

13. A sealing method for a material adapted to be sealed, comprising, in combination, the steps of continuously moving superimposed elongated sheets of the material in one direction at a predetermined speed; sealing said superimposed sheets to form a plurality of longitudinally spaced transversal seams by a heat sealing device moving at the same speed as said sheets; returning said sealing device in a direction opposite to the movement of said sheets; and sealing said sheets in a further sealing operation to form a plurality of longitudinally spaced further transversal seams spaced from the seams formed in the preceding sealing operation for the distance between the transversal seams produced in each sealing operation.

References Cited in the file of this patent

UNITED STATES PATENTS

| Number | Name | Date |
|---|---|---|
| 2,467,879 | Billeb | Apr. 19, 1949 |